United States Patent Office 2,978,492
Patented Apr. 4, 1961

2,978,492
NITROCARBAMATES

Milton B. Frankel, Pasadena, Calif., assignor to Aerojet-General Corporation, Azusa, Calif., a corporation of Ohio No Drawing. Filed Jan. 17, 1955, Ser. No. 482,410

14 Claims. (Cl. 260—482)

This invention relates to new compositions of matter and a method for their preparation. In particular, it relates to nitrocarbamates having the general formula:

$$R-\underset{\underset{H}{|}}{N}-\underset{\underset{O}{\|}}{C}-O-R'$$

wherein R is an alkyl radical and R' is a nitroalkyl radical.

The new compounds of this invention are prepared by condensing isocyanates and nitro-alcohols, in accordance with the general reaction scheme set forth below:

$$R-NCO + R'OH \longrightarrow R-\underset{\underset{H}{|}}{N}-\underset{\underset{O}{\|}}{C}-O-R'$$

wherein R and R' are as defined above.

As a matter of convenience, the reaction is usually conducted at reflux temperature. Although the reaction can be performed at lower temperatures, the rate of reaction is usually too slow for ordinary purposes, while at higher temperatures, the reaction is difficult to control. The reaction is preferably conducted in the presence of a condensation catalyst such as ferric acetylacetonate. Increased smoothness and control of the reaction is achieved when an inert organic solvent such as chloroform is used.

The nitro-alcohols used as starting materials are obtained by condensing nitronate salts of alkanes with: formaldehyde to produce alcohols such as 2,2,2-trinitroethyl alcohol and 2,2-dinitropropyl alcohol; or with unsaturated acids, as described in the J. Org. Chem., vol. 16, pp. 161–4, 1951, to produce nitro-acids; the halidess of which are reduced by sodium borohydride to nitro-alcohols, as disclosed in assignee's copending application Serial No. 392,471, filed November 16, 1953, now abandoned.

To more clearly illustrate this invention, the following examples are presented. It is to be understood, however, that these examples are presented merely as a means of illustration, and are not intended to limit the scope of the invention in any way.

EXAMPLE I
*Preparation of N-methyl-2,2,2-trinitroethyl carbamate*

Equivalent quantities of methyl isocyanate and 2,2,2-trinitroethyl alcohol were refluxed with about 1% by weight of ferric acetylacetonate for 8 hours. The solution was then evaporated to dryness in vacuo leaving a quantitative yield of a yellow oil, identified as N-methyl-2,2,2-trinitroethyl carbamate.

EXAMPLE II
*Preparation of N-ethyl-2,2,2-trinitroethyl carbamate*

Equivalent quantities of ethyl isocyanate and 2,2,2-trinitroethyl alcohol were refluxed with about 1% by weight of ferric acetylacetonate for 8 hours. The solution was then evaporated to dryness in vacuo leaving a quantitative yield of a yellow oil, identified as N-ethyl-2,2,2-trinitroethyl carbamate.

A wide variety of compounds can be prepared in accordance with the procedure used in the examples set forth above. N-methyl-2,2-dinitropropyl carbamate is prepared in this manner by condensing 2,2-dinitropropanol with methyl isocyanate; N-methyl-2,2,4,4-tetranitropentyl carbamate is prepared by condensing 2,2,4,4-tetranitropentanol with methyl isocyanate; and N-isopropyl-3,3,3-trinitropropyl carbamate is prepared by condensing 3,3,3-trinitropropanol with isopropyl isocyanate.

It is apparent from the above discussion that any member of the above series of nitrocarbamates can be prepared by condensing isocyanates with the appropriate nitro-containing alcohols.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:
1. As compositions of matter, nitrocarbamates having the general formula:

$$R-\underset{\underset{H}{|}}{N}-\underset{\underset{O}{\|}}{C}-O-CH_2-\underset{\underset{NO_2}{|}}{\overset{\overset{NO_2}{|}}{C}}-R'$$

wherein R is a lower alkyl radical and R' is a radical selected from the group consisting of lower alkyl, nitro, and lower nitroalkyl radicals.

2. As a composition of matter, N-methyl-2,2,2-trinitroethyl carbamate having the structural formula:

$$CH_3-\underset{\underset{H}{|}}{N}-\underset{\underset{O}{\|}}{C}-O-CH_2-\underset{\underset{NO_2}{|}}{\overset{\overset{NO_2}{|}}{C}}-NO_2$$

3. As a composition of matter, N-ethyl-2,2,2-trinitroethyl carbamate having the structural formula:

$$CH_3CH_2-\underset{\underset{H}{|}}{N}-\underset{\underset{O}{\|}}{C}-O-CH_2-\underset{\underset{NO_2}{|}}{\overset{\overset{NO_2}{|}}{C}}-NO_2$$

4. As a composition of matter, N-methyl-2,2-dinitropropyl carbamate having the structural formula:

$$CH_3-\underset{\underset{H}{|}}{N}-\underset{\underset{O}{\|}}{C}-O-CH_2-\underset{\underset{NO_2}{|}}{\overset{\overset{NO_2}{|}}{C}}-CH_3$$

5. As a composition of matter, N-methyl-2-2,4,4-tetranitropentyl carbamate having the structural formula:

$$CH_3-\underset{\underset{H}{|}}{N}-\underset{\underset{O}{\|}}{C}-O-CH_2-\underset{\underset{NO_2}{|}}{\overset{\overset{NO_2}{|}}{C}}-CH_2-\underset{\underset{NO_2}{|}}{\overset{\overset{NO_2}{|}}{C}}-CH_3$$

6. As a composition of matter, N-isopropyl-3,3,3-trinitropropyl carbamate having the structural formula:

$$\underset{CH_3}{\overset{CH_3}{\diagdown}}CH-\underset{\underset{H}{|}}{N}-\underset{\underset{O}{\|}}{C}-O-CH_2CH_2-\underset{\underset{NO_2}{|}}{\overset{\overset{NO_2}{|}}{C}}-NO_2$$

7. The method of preparing nitrocarbamates having the general formula:

$$R-N(H)-C(=O)-O-R'$$

which comprises reacting an isocyanate having the general formula:

$$R-NCO$$

with a nitroalcohol having the general formula:

$$R'-OH$$

wherein R is a lower alkyl radical and R' is a lower nitroalkyl radical.

8. The method of claim 7 wherein the reaction is conducted in the presence of ferric acetylacetonate.

9. The method of claim 8 wherein the reaction is conducted in the presence of an inert organic solvent.

10. The method of preparing N-methyl-2,2,2-trinitroethyl carbamate which comprises reacting methyl isocyanate with 2,2,2-trinitroethanol.

11. The method of preparing N-ethyl-2,2,2-trinitroethyl carbamate which comprises reacting ethyl isocyanate with 2,2,2-trinitroethanol.

12. The method of preparing N-methyl-2,2-dinitropropyl carbamate which comprises reacting methyl isocyanate with 2,2-dinitropropanol.

13. The method of preparing N-methyl-2,2,4,4-tetranitropentyl carbamate which comprises reacting methyl isocyanate with 2,2,4,4-tetranitropentanol.

14. The method of preparing N-isopropyl-3,3,3-trinitropropyl carbamate which comprises reacting isopropyl isocyanate with 3,3,3-trinitropropanol.

References Cited in the file of this patent

UNITED STATES PATENTS

| | | |
|---|---|---|
| 2,433,595 | Campbell | Dec. 30, 1947 |
| 2,677,698 | Deutschman et al. | May 4, 1954 |
| 2,683,728 | Mastin et al. | July 13, 1954 |

FOREIGN PATENTS

| | | |
|---|---|---|
| 135,832 | Sweden | May 27, 1952 |
| 138,456 | Sweden | Dec. 23, 1952 |

OTHER REFERENCES

Fieser et al.: "Organic Chemistry," D. C. Heath & Co., Boston (1944), page 615.

Chemical Abstracts 47, 6974c (1953).